United States Patent [19]

Shills, III

[11] Patent Number: 4,743,471

[45] Date of Patent: May 10, 1988

[54] METHOD FOR RANDOM COLORING OF ROOF TILES

[75] Inventor: Peter P. Shills, III, Riverside, Calif.

[73] Assignee: Monier Roof Tile Inc., Orange, Calif.

[21] Appl. No.: 52,429

[22] Filed: May 21, 1987

[51] Int. Cl.⁴ .............................................. B05D 5/06
[52] U.S. Cl. .................................... 427/262; 52/311;
427/280; 427/424
[58] Field of Search ............... 427/262, 267, 280, 188,
427/424; 118/323, 697, 314; 52/311

[56] References Cited

U.S. PATENT DOCUMENTS

| | | | |
|---|---|---|---|
| 1,877,481 | 9/1932 | Prouty | 52/311 X |
| 1,998,078 | 4/1935 | Freegard | 427/188 |
| 2,111,761 | 3/1938 | Eckert | 427/188 |
| 2,740,376 | 4/1956 | Kovach et al. | 118/323 X |
| 3,875,716 | 4/1975 | Eusemann | 52/311 |
| 4,523,543 | 6/1985 | Brady et al. | 427/188 X |

*Primary Examiner*—Evan K. Lawrence
*Attorney, Agent, or Firm*—Bogucki, Scherlacher, Mok & Roth

[57] ABSTRACT

Methods and apparatus are described for the random coloring of concrete roof tiles during the manufacture of such tiles. This enables the tiles to be installed in random fashion and without following any particular sequence. At the same time a roof is achieved which has an aesthetically pleasing random variation of the tile colors and which is absent the displeasing color patterns which often occur when tiles colored by a simple and frequently repeating pattern are not installed in proper sequence. Newly formed concrete tiles are sequentially advanced by a conveyor beneath a base applicator which sprays a base coat of coloring slurry over essentially the entire top surface of each tile. One or more overspray applicators located downstream from the base applicator then spray additional colors over different portions of the top surfaces of the tiles in intermittent, randomly varying fashion so that the color pattern on each tile is essentially unique and is not repeated on any other tile. The overspray applicator includes a blade which is gated into contact with a rotating drum to apply coloring slurry to a rotating cylindrical brush in intermittent, randomly varying fashion and which is moved across the brush to vary the spray pattern across the width of the passing tiles in intermittent, randomly varying fashion.

9 Claims, 4 Drawing Sheets

FIG. 7

| STEP | INSTRUCTION OP | DATA-1 | DATA-2 | OP1 (1) | OP2 (2) | SOL.2 (3) | SOL.1 (4) | BP (5) | OSL1 (6) | OSL2 (7) | 8 | 9 | 10 | 11 | 12 |
|---|---|---|---|---|---|---|---|---|---|---|---|---|---|---|---|
| 00 | 2 | 00 | 01 |  |  |  |  |  |  |  |  |  |  |  |  |
| 01 | 9 | 01 | .5 | X | X | X |  | X |  | X |  |  |  |  |  |
| 02 | 9 | 02 | .7 | X | X | X | X | X |  | X |  |  |  |  |  |
| 03 | 9 | 00 | .9 |  | X | X | X | X |  |  |  |  |  |  |  |
| 04 | 9 | 03 | .0 | X | X | X |  | X |  |  |  |  |  |  |  |
| 05 | 9 | 02 | .3 | X | X | X | X | X |  | X |  |  |  |  |  |
| 06 | 9 | 01 | .6 | X | X | X |  | X | X | X |  |  |  |  |  |
| 07 | 9 | 04 | .0 | X | X | X |  | X |  |  |  |  |  |  |  |
| 08 | 9 | 02 | .0 | X | X | X | X | X |  |  |  |  |  |  |  |
| 09 | 9 | 01 | .8 | X | X | X |  | X | X | X |  |  |  |  |  |
| 10 | 9 | 01 | .2 | X | X | X |  | X |  |  |  |  |  |  |  |
| 11 | 9 | 00 | .6 | X | X | X | X |  |  |  |  |  |  |  |  |
| 12 | 9 | 03 | .2 | X | X | X |  |  |  |  |  |  |  |  |  |
| 13 | 9 | 02 | .3 | X | X | X |  | X |  | X |  |  |  |  |  |
| 14 | 9 | 04 | .1 | X | X |  |  |  |  |  |  |  |  |  |  |
| 15 | 9 | 01 | .9 | X | X |  |  |  |  |  |  |  |  |  |  |
| 16 | 9 | 02 | .0 | X | X | X |  |  |  |  |  |  |  |  |  |
| 17 | 9 | 01 | .7 | X | X | X |  |  |  |  |  |  |  |  |  |
| 18 | 9 | 02 | .7 | X |  |  |  |  |  |  |  |  |  |  |  |
| 19 | 9 | 01 | .6 | X | X |  |  |  |  | X |  |  |  |  |  |
| 20 | 9 | 03 | .0 | X | X |  |  |  |  |  |  |  |  |  |  |
| 21 | 9 | 01 | .2 |  | X |  |  |  |  |  |  |  |  |  |  |
| 22 | 9 | 02 | .2 | X | X | X | X |  |  | X |  |  |  |  |  |
| 23 | 9 | 01 | .8 | X | X | X | X |  |  |  |  |  |  |  |  |
| 24 | 9 | 02 | .6 | X | X | X |  |  |  |  |  |  |  |  |  |
| 25 | 9 | 03 | .1 | X | X | X |  |  |  |  |  |  |  |  |  |
| 26 | 9 | 01 | .7 | X | X |  |  |  |  |  |  |  |  |  |  |
| 27 | 9 | 02 | .2 | X | X |  |  |  |  |  |  |  |  |  |  |
| 28 | 9 | 01 | .2 | X | X | X | X |  |  | X |  |  |  |  |  |
| 29 | 9 | 02 | .8 | X | X | X | X |  |  |  |  |  |  |  |  |  |
| 30 | 9 | 04 | .0 | X | X |  |  |  |  |  |  |  |  |  |  |
| 31 | 9 | 01 | .2 | X | X |  |  |  |  |  |  |  |  |  |  |
| 32 | 9 | 02 | .3 | X | X |  | X |  |  | X |  |  |  |  |  |
| 33 | 9 | 01 | .9 | X | X | X | X |  |  |  |  |  |  |  |  |  |
| 34 | 9 | 00 | .8 |  | X | X |  | X | X |  |  |  |  |  |  |
| 35 | 9 | 01 | .5 | X | X |  | X | X | X |  |  |  |  |  |  |
| 36 | 9 | 02 | .5 | X | X |  |  |  |  |  |  |  |  |  |  |
| 37 | 9 | 03 | .1 | X | X | X |  |  |  |  |  |  |  |  |  |
| 38 | 9 | 02 | .7 |  | X |  |  |  |  | X |  |  |  |  |  |
| 39 | 9 | 01 | .2 | X |  |  | X |  |  |  |  |  |  |  |  |
| 40 | 9 | 02 | .0 | X | X |  | X | X |  | X |  |  |  |  |  |
| 41 | 9 | 01 | .0 | X | X |  |  |  |  |  |  |  |  |  |  |
| 42 | 9 | 01 | .8 | X | X |  |  |  |  |  |  |  |  |  |  |
| 43 | 9 | 02 | .9 | X | X |  | X |  | X |  |  |  |  |  |  |
| 44 | 9 | 04 | .0 | X |  |  | X |  |  | X |  |  |  |  |  |
| 45 | 9 | 02 | .2 | X | X |  | X |  |  |  |  |  |  |  |  |
| 46 | 9 | 01 | .2 |  | X |  |  | X |  |  |  |  |  |  |  |
| 47 | 9 | 01 | .7 |  |  | X |  | X |  |  |  |  |  |  |  |
| 48 | 9 | 02 | .7 |  | X | X | X |  |  |  |  |  |  |  |  |
| 49 | 9 | 03 | .1 |  | X | X |  |  |  |  |  |  |  |  |  |
| 50 | 9 | 01 | .9 |  |  |  | X | X | X | X |  |  |  |  |  |
| 51 | 9 | 00 | .5 | X | X |  |  |  |  |  |  |  |  |  |  |
| 52 | 9 | 02 | .1 |  | X |  |  |  |  |  |  |  |  |  |  |
| 53 | 9 | 00 | .9 |  | X |  |  |  | X |  |  |  |  |  |  |
| 54 | 9 | 01 | .6 | X | X | X | X | X |  |  |  |  |  |  |  |
| 55 | 9 | 02 | .8 |  | X | X | X |  |  |  |  |  |  |  |  |
| 56 | 9 | 04 | .0 |  | X |  | X |  | X |  |  |  |  |  |  |
| 57 | 9 | 01 | .2 |  | X |  | X |  | X |  |  |  |  |  |  |
| 58 | 9 | 02 | .1 |  |  | X | X | X |  |  |  |  |  |  |  |
| 59 | 9 | 01 | .8 |  |  |  | X |  |  |  |  |  |  |  |  |
| 60 | 9 | 02 | .6 |  |  |  | X |  |  |  |  |  |  |  |  |
| 61 | 9 | 01 | .2 | X | X |  |  | X |  |  |  |  |  |  |  |
| 62 | 9 | 01 | .6 | X | X |  | X |  |  |  |  |  |  |  |  |
| 63 | 3 | 01 | 00 |  |  |  |  |  |  |  |  |  |  |  |  |

METHOD FOR RANDOM COLORING OF ROOF TILES

BACKGROUND OF THE INVENTION

1. Field of the Invention

The present invention relates to methods for the manufacture of concrete roof tiles, and more particularly to methods for the application of coloring slurries to concrete roof tiles during the manufacture of such tiles.

2. History of the Prior Art

Concrete roof tiles have enjoyed widespread acceptance and increasing popularity in recent years. Such tiles have a number of advantages over other types of roofing materials, including the fact that they are extremely durable and are noncombustible.

Concrete roof tiles are typically manufactured by the continuous extrusion of a ribbon of concrete onto a plurality of supporting molds with the ribbon being periodically cut to form the individual tiles. The tiles are then sprayed with one or more coloring slurries prior to curing of the concrete. Following curing, the hardened tiles are separated from the supporting molds and are typically stacked on wood pallets for transport to the job site where they are to be installed.

As the popularity of concrete roof tiles has increased, various different coloring schemes have evolved which provide architects, builders and roofers with a variety of different eye-pleasing effects. Whereas conventional shingles are typically finished in a single, uniform color or in a relatively simple, repeating pattern, concrete roof tiles can be manufactured with the individual tiles having as many as four, five or even more different colors so as to provide the finished roof with a variety of different, aesthetically pleasing multicolor effects. The variety of possibilities is even further enhanced by the different shapes or so-called profiles in which concrete roof tiles can be made. Most such shapes are undulating or rippling in configuration. This enables different colors to be applied to different portions of the tile, for example, so that one color will dominate when the roof is viewed when the particular angle with still other colors dominating when the roof is viewed from other angles.

Present techniques for applying multiple colors to concrete roof tiles typically utilize relatively simple repeating patterns. Those patterns which vary from one tile to the next usually repeat after just a few tiles. For example, where an overspray applicator having a scraper in conjunction with a rotating drum and a rotating cylindrical brush is used to provide overspray coloring to tiles which have been sprayed with a base coat of different color, the overspray slurry is continuously supplied by the scraper to the rotating brush for spraying onto the tiles. At the same time the scraper is continuously oscillated across a transverse path so as to move the overspray pattern back and forth across the widths of the tiles as they pass under the overspray applicator. This provides a band of the overspray or second color which undulates across the widths of the tiles in repeating, predictable fashion. Even where additional colors are used, the patterns are simple and repeat frequently.

Conventional installation techniques involving multi-color concrete roof tiles typically require the installer to pay some attention to the order in which the tiles are installed on the roof. For example, multi-color tiles of varying patterns often require hand blending. This means that the installer must hand pick the tiles from stacks thereof as the tiles are sequentially installed in rows along the roof. An experienced installer using this technique can achieve desired artistic effects while at the same time avoiding certain designs or effect which may be considered displeasing. Some types of tiles require that the installer place the tiles along the roof in a particular sequence. For example, a varying multi-color pattern which repeats with every fourth tile so as to result in four different color patterns on the individual tiles may require that the repeating sequence of four patterns be continuously repeated as the installer lays the tiles side-by-side along the roof.

Both hand blending sequential installation require considerable extra effort on the part of the installer, and above all are quite time consuming. Tile roofs can be installed in far more economical fashion if the installer can simply pick tiles at random and without regard to the manner in which the color patterns on the individual tiles may blend together to achieve a particular effect. At the same time such a random installation of tiles should provide a pleasing, attractive multi-color appearance, which appearance should be variable in order to achieve different effects.

SUMMARY OF THE INVENTION

The present invention provides methods for the random coloring of roof tiles in a manner which enables the tiles to be installed randomly while at the same time achieving desired visual effects which may be varied. This is accomplished by applying a base coat of given color over essentially the entire top surface of each of the tiles, following which one or more overspray coats of different color are applied in differing amounts and to different portions of the top surfaces of the tiles. The overspray coatings are applied in intermittent, randomly varying fashion, and this combined with the feathering effect provided by a rotating cylindrical brush and the related components within the applicator results in a color pattern on each individual tile which is truly unique. The precise pattern is not repeated on any other tiles. At the same time some regard is given to color balance and certain artistic effects which may be desired, and this in turn is used to determine the frequency, duration and location of the various overspray colors being sprayed onto the tiles. Thus, if a particular overspray color is to dominate the overall visual effect of the installed roof, then the frequency and duration of the spraying of that color will be increased as necessary even though the times between spraying and the duration of spraying are varied in random fashion.

In addition to varying the time of application of the overspray colors in intermittent, randomly varying fashion in accordance with the invention, the locations of such overspray on the tiles are also preferably varied in random fashion. Typically, each overspray applicator will provide the overspray color in a pattern or band which is narrower than the width of the tiles. In such instances the spraying apparatus is preferably repositioned periodically and in random fashion along a transverse path extending across the tiles.

In a more detailed example of a method and apparatus according to the invention, concrete roof tiles which have been extruded and cut into individual tiles in conventional fashion are advanced along a conveyor to a coloring or painting region where a base coat applicator sprays a base coat of coloring slurry over essentially the entire top surface of each tile as it passes thereunder.

One or more overspray applicators are positioned downstream of the base coat applicator and within the coloring or painting region so as to randomly apply one or more overspray colorings. A multi-step controller which is used to control the overspray applicators as well as the base coat applicator is programmed to perform various functions in the desired intermittent, random fashion. The successive steps of the controller are of varying duration. Some of the steps are used to initiate the spraying of the overspray colors, while other steps are used to reposition the spraying apparatus at different locations across the widths of the tiles passing on the conveyor below. The durations of the various steps of the controller and the assignment thereof to perform the different functions are chosen in the desired random fashion. At the same time the frequency and duration with which the overspray colors are sprayed may be chosen so as to achieve a desired color emphasis in relation to the other colors.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 7 is a chart listing the successive steps undertaken by a controller in a particular example of a process in accordance with the invention.

DETAILED DESCRIPTION

Figure 1:
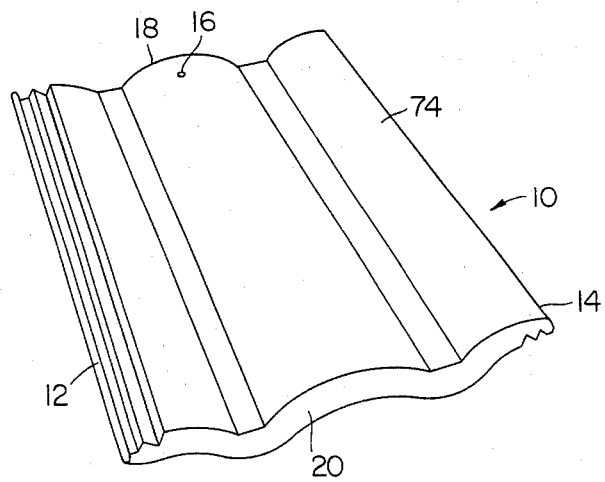
FIG. 1 is a perspective view of a concrete roof tile of the type which is manufactured by the methods of the invention.

FIG. 1 depicts a concrete roof tile 10 of the type which is colored by methods in accordance with the invention and associated apparatus during the manufacture thereof. The tile 10 is of elongated, rectangular configuration and has a generally undulating or wavy cross-sectional shape defining its "profile". Concrete roof tiles are manufactured in any of a variety of different profiles, some of which are relatively flat and others of which are of the type characterizing the concrete roof tile 10 of FIG. 1 to provide the tile with a three-dimensional artistic effect.

The concrete roof tile 10 illustrated in FIG. 1 has opposite left and right edges 12 and 14 respectively which are of opposite, grooved, mating configuration. This enables the left edge 12 of the tile 10 to nestle in interlocked relation with the right edge of a tile which is adjacent and on the left side of the tile 10. Similarly, the right edge 14 is able to nestle in mating relation with the left edge of an adjacent tile to the right of the tile 10. The tile 10 is provided with a nail aperture 16 therein at an upper central portion thereof. During installation of the tile 10, a nail is driven through the aperture 16 into the roof to secure the tile in place. The nail aperture 16 is located just below an upper edge 18 of the tile 10 so as to be covered by an adjacent tile located immediately above the tile 10 after the tile 10 is nailed in place on the roof. An opposite lower edge 20 of the tile 10 extends over the upper edge and the nail aperture of an adjacent tile immediately below the tile 10.

Figure 2:
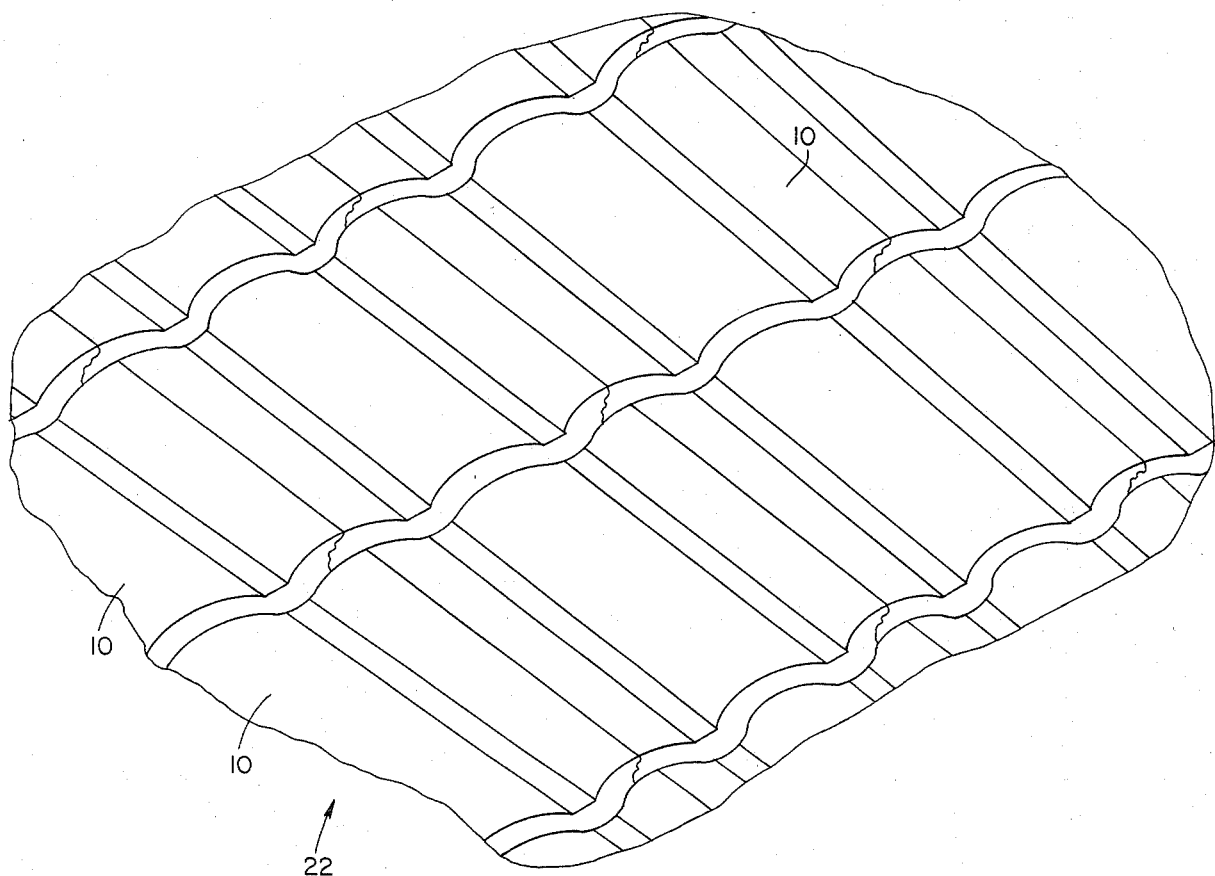
FIG. 2 is a perspective view of a plurality of the concrete roof tiles of FIG. 1 installed together on a roof.

FIG. 2 shows a portion of a roof 22 on which a plurality of the concrete roof tiles 10 have been installed. It will be seen from FIG. 2 that the grooved left and right edges 12 and 14 of each of the tiles 10 interlock in mating fashion with the edges of adjacent tiles to the left and right thereof to form generally continuous undulating or corrugated rows of the tile 10 extending across the width of the roof 22. The lower edges 20 of the tiles in each row overlap the upper edges 18 and the nail apertures 16 of the tiles in the row immediately below. Conversely, the upper edges 18 and the nail apertures 16 of the tiles 10 in the row are covered by the tiles in the row immediately above.

Concrete roof tiles of the type shown in FIGS. 1 and 2 can be colored in a single uniform color so that the installed roof as shown in FIG. 2 is comprised of a single color. However, as is known in the art each of the tiles can be colored with two or more different colors so as to provide the roof 22 with pleasing visual effects that are not possible when the tiles are finished in a single color.

Figure 3:
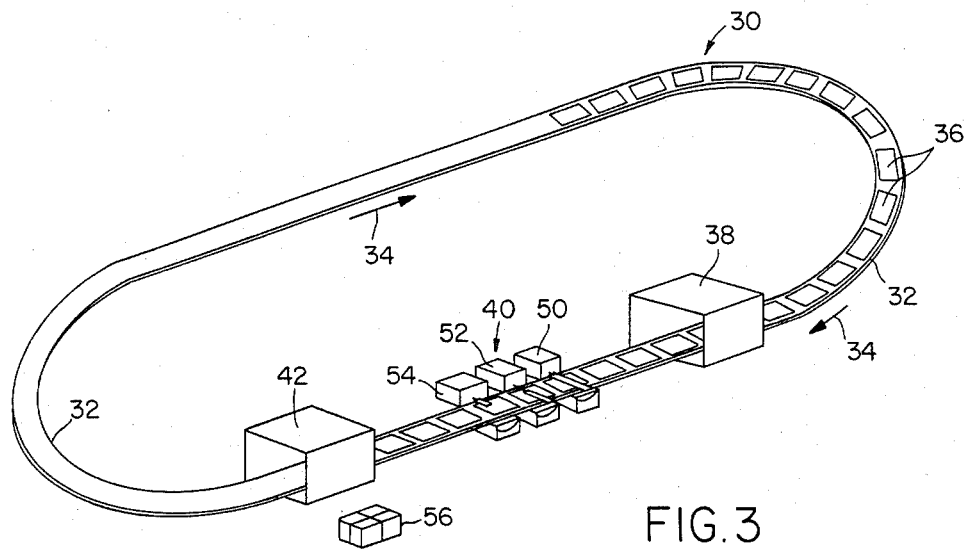
FIG. 3 is a perspective view of an endless conveyor line used in manufacturing concrete roof tiles of the type shown in FIGS. 1 and 2.

FIG. 3 depicts an endless conveyor line 30 used in manufacturing the concrete roof tiles 10. The conveyor line 30 includes a continuously moving conveyor 32 arranged into an endless loop. The conveyor 32 continuously moves in the direction shown by arrows 34 in FIG. 3.

A plurality of molds 36 are placed end-to-end on the continuously moving conveyor 32 upstream of an extruder 38. Each of the molds 36 has an upper surface configured like the underside of the concrete roof tile 10. A wet mixture of concrete comprised of cement and sand is fed into the extruder 38. The extruder 38 in turn extrudes the wet mixture of concrete as a continuous ribbon which is laid onto the end-to-end molds 36 passing through the extruder 38 on the continuously moving conveyor 32. The extruder 38 which is of conventional configuration includes apparatus for periodically cutting the extruded ribbon of concrete to form the individual concrete roof tiles 10. The extruder 38 also includes apparatus for punching the nail aperture 16 through each tile 10. Each of the concrete roof tiles 10 as formed by the extruder 38 resides on the upper surface of one of the molds 36.

The molds 36 on the continuously moving conveyor 32 are used to carry the concrete roof tiles 10 from the extruder 38 through a tile coloring region 40 of the endless conveyor line 30 to a racker 42. A base coat applicator 50 is located within the tile coloring region 40 together with a first overspray applicator 52 and a second overspray applicator 54. The first overspray applicator 52 is located downstream of the base coat applicator 50 along the conveyor 32. The second overspray applicator 54 is located downstream of the first overspray applicator 52 along the conveyor 32. The applicators 50, 52 and 54 apply a base coat of coloring slurry followed by first and second overspray coats of coloring slurry on the passing tiles as they move along the conveyor 32 through the tile coloring region 40 from the extruder 38 to the racker 42. The tile coloring process is described in detail hereafter.

Following the application of coloring slurries by the applicators 50, 52 and 54, the tiles 10 which are carried by the molds 36 on the conveyor 32 are advanced to the racker 42. The racker 42 which is of conventional design loads the molds 36 and the tiles 10 carried thereby onto racks 56. When each rack 56 is fully loaded, a forklift carries the loaded rack 56 to a curing facility (not shown) where the coloring slurry is dried and the concrete is cured. This process typically takes about six hours.

Following curing of the tiles 10, a forklift is used to return the rack 56 containing the cured tiles and the supporting molds 36 to the racker 42. The racker 42 loads the individual tiles 10 and supporting molds 36 back onto the conveyor 32 from the rack 56. The conveyor 32 carries the tiles 10 and supporting molds 36 away from the rack 42 to a region where a depalleter (not shown) of conventional design is employed to initiate separation of each of the tiles 10 from its supporting mold 36. The separated tiles 10 are loaded onto wooden pallets where they typically remain until they are transported to a job site for installation on a roof. The molds 36 are placed back on the conveyor 32 where they are eventually carried by the conveyor 32 back to the extruder 38 to receive and support tiles continuously being formed by the extruder 38 as previously described.

The base coat applicator 50 and the first and second overspray applicators spray coloring slurries on the passing tiles 10. The coloring slurries are comprised of a wet mixture of cement, synthetic iron oxide, silica sand and additives. The synthetic iron oxide is the pigment of the slurry and is chosen to provide the slurry with a desired color. The slurry thus comprises a cementitious paint which is sprayed by the applicator 52 onto the passing tiles 10.

Figure 5:
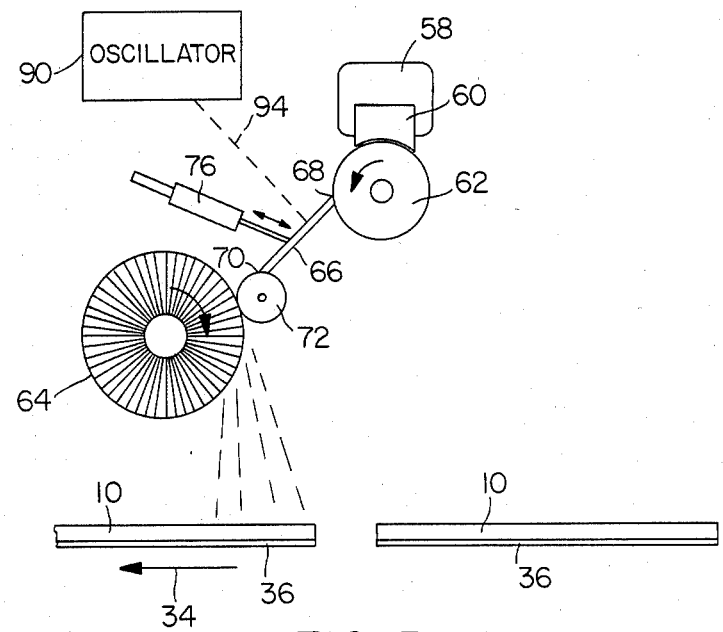
FIG. 5 is a diagrammatic illustration of the basic operative components of the slurry applicator of FIG. 4 illustrating the manner in which the slurry is sprayed onto the concrete roof tiles to color the tiles.
Figure 4:
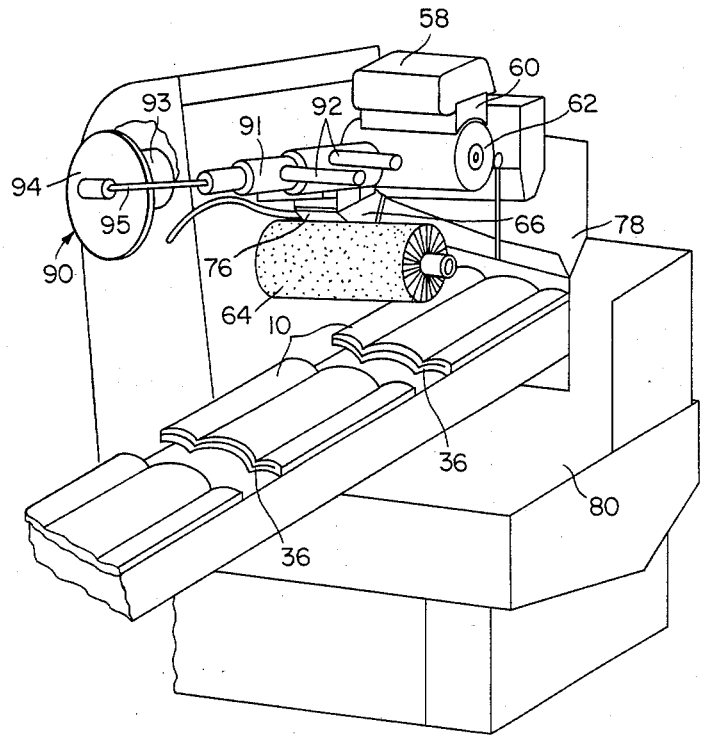
FIG. 4 is a perspective view of one of the slurry applicators used to color concrete roof tiles in the conveyor line of FIG. 3.

The first overspray applicator 52 is shown in detail in FIG. 4 with the principal operative components thereof being also shown in FIG. 5. The applicator 52 includes an electrically operated pump 58 for pumping a stream of the slurry into a reservoir 60 mounted on top of a rotating cylindrical drum 62. The reservoir 60 dispenses a controlled stream of the slurry onto the cylindrical drum 62 along the length of the drum 62. This forms a layer or coating of the slurry on the outer surface of the drum 62 as the drum rotates downwardly and away from the bottom of the reservoir 60.

A generally cylindrical brush 64 is mounted spaced apart from the drum 62 for rotation about an axis beneath and generally parallel to the axis of rotation of the drum 62. The cylindrical brush 64 is mounted above the conveyor 32 so as to extend transversely across the passing tiles 10 relative to the longitudinal direction of movement of the conveyor 32 and the tiles 10. An elongated scraper 66 is disposed between the brush 64 and the drum 62. An upper edge 68 of the scraper 66 engages the cylindrical drum 62 across a portion of the length of the drum 62 to peel off the coating of slurry formed on the outer surface of the drum 62 as the drum 62 rotates beneath the reservoir 60. The coating of wet slurry flows down the scraper 66 to an opposite bottom edge 70 of the scraper 66 disposed adjacent a rotating flick roll 72. The flick roll 72 which is mounted for rotation along an axis generally parallel to the axes of rotation of the drum 62 and the brush 64 rotates in a direction from the bottom edge 70 of the scraper 66 to the brush 64 which it engages to enhance the flowing coat of slurry from the scraper 66 onto the brush 64. The rotating brush 64 slings or sprays the wet slurry onto a top surface 74 of each of the concrete roof tiles 10 passing thereunder.

The first overspray applicator 52 includes apparatus for controlling both the quantity and the location of the spray of slurry directed onto the top surfaces 74 of the tiles 10. The scraper 66 is mounted for pivoting movement about a horizontal axis adjacent the bottom edge 70 thereof. A solenoid 76 coupled to the scraper 66 holds the scraper 66 in a position in which the upper edge 68 of the scraper 66 is moved away from the rotating cylindrical drum 62 when the solenoid is not energized. In this position the layer of slurry on the outer surface of the drum 62 is not removed by the scaper 66 but instead moves to the lowermost position of the drum 62 from which it falls into a trough 78. The trough 78 is mounted at an angle so that the slurry flows to an end thereof and then into a basin 80 located beneath the conveyor 32. From the basin 80 the slurry is recirculated to the reservoir 60 using the pump 58.

Energizing of the solenoid 76 pivots the scraper 66 until the upper edge 68 of the scraper 66 resides against the outer surface of the drum 62 as shown in FIG. 5. This causes the scraper 66 to strip the coating or layer of slurry from the outer surface of the drum 62 so that the slurry flows down the scraper 66, over the flick roll 72 and onto the brush 64 for spraying onto the top surfaces 74 of the passing concrete roof tiles.

A further control of the first overspray applicator 52 resides in an oscillator 90 which is mechanically coupled to the scraper 66 and which is capable of moving the scraper 66 back and forth in reciprocating fashion across the length of the drum 62 and the brush 64. The scraper 66 is pivotally coupled to a carriage 91 which is capable of sliding along a pair of horizontal pins 92 mounted on the frame of the applicator 52. The reciprocating path of movement of the scraper 66 is along an axis parallel to the axes of rotation of the drum 62 and the brush 64 and which is transversely disposed relative to the longitudinal direction of movement of the tiles 10 along the conveyor 32. The oscillator 90 includes a DC motor drive 93 coupled to rotate a disk 94 mounted on the side of the first overspray applicator 52 as shown in FIG. 4. A connecting rod 95 which has one end thereof coupled to the scraper 66 has an opposite end thereof pivotally coupled to the disk 94 adjacent the outer periphery of the disk 94. Energizing the DC motor drive 93 provides rotation of the disk 94, and this in turn provides the reciprocating movement of the scraper 66 along the transverse path therefor via the connecting rod 95. Continuously energizing the DC motor drive 93 provides continuous reciprocating movement of the scraper 66 along the transverse path. Periodic energization of the DC motor drive 93 for selected time periods results in incremental movements of the scraper 66 along the transverse path in one direction and then back along the path in the opposite direction.

The ability of the solenoid 76 and the oscillator 90 to vary the application and location of the coloring slurry on the passing tiles 10 is advantageously utilized in accordance with the invention as described hereafter. Of particular advantage is the fact that the solenoid 76 does not control application of the slurry to the tiles 10 in absolute on-off fashion because of the time required for the slurry to flow over the scraper 66 and the flick roll 72 onto the brush 64 and because of the slinging manner with which the brush 64 sprays the slurry onto the tiles 10. Consequently when the solenoid 76 moves the scraper 66 into engagement with the drum 62, a small amount of time is required for the slurry to flow from the scraper 66 onto the flick roll 72 and for the brush 64 to receive the slurry and thereafter sling the slurry onto the tiles 10. Conversely, when the solenoid 76 pulls the scraper 66 away from the drum 62, the residue of slurry on the scraper 66 and the flick roll 72 continues to flow onto the brush 64 from which it is sprayed onto the tiles 10 before spraying is terminated. Also, the outer surface of the brush 64 is comprised of bristles which tend to receive and then sling droplets of slurry in varying, nonuniform fashion. All of this results in a feathering effect in which gradually increasing amounts of slurry are sprayed onto the passing tiles 10 following the energizing of the solenoid 76. When energizing of the solenoid 76 is terminated, by the same token, the spraying of the slurry onto the passing tiles 10 decreases gradually.

Further variation in the application of the slurry to the tiles 10 is provided by the oscillator 90 which has the ability to relocate the scraper 66 to different locations along the transverse path thereof relative to the tiles 10 which pass therebelow.

Figure 6:
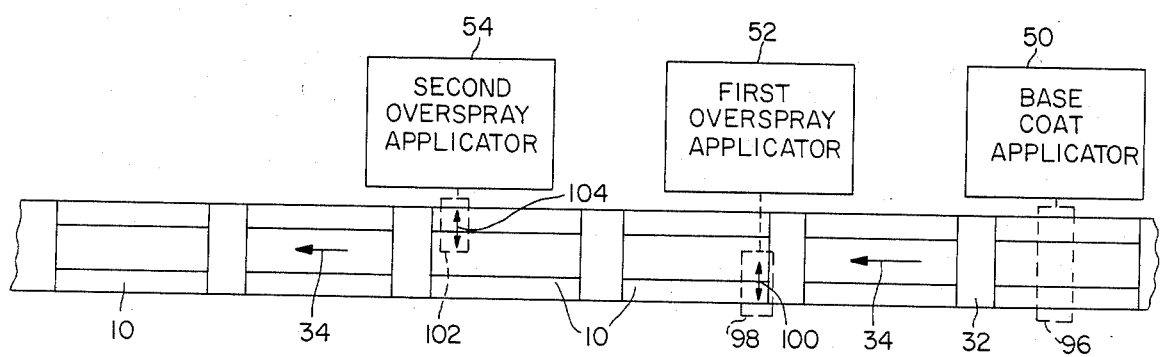
FIG. 6 is a diagrammatic overhead view of the coloring region of the conveyor line of FIG. 3 illustrating the manner in which a base coat applicator and two different overspray applicators are used to spray slurries of three different colors on concrete roof tiles.

FIG. 6 shows the tile coloring region 40 of the endless conveyor line 30 which includes the base coat applicator 50, the first overspray applicator 52 and the second overspray applicator 54 in conjunction with the adjacent portion of the continuously moving conveyor 32. The base coat applicator 50 has a configuration like that of the first overspray applicator 52 shown in FIGS. 4 and 5 with the exception that the scraper 66 thereof is wide enough to extend across the entire lengths of the drum 62 and the brush 64. The scraper 66 does not undergo reciprocating motion, and there is no oscillator 90. Instead, the scraper 66 of the base coat applicator 50 provides a spray pattern 96 shown in dotted outline in FIG. 6 which extends across the entire width of each of the passing tiles. In this manner essentially the entire top surface 74 of each passing tile 10 is coated with the base color by the base coat applicator 50. Although the base coat applicator 50 has the solenoid 76, the solenoid 76 is continuously energized to completely cover the top surface 74 of each tile 10 with the base coat slurry.

As described above in connection with FIGS. 4 and 5, the first overspray applicator 52 has a scraper 66 the length of which is substantially less than the lengths of the drum 62 and the brush 64. This results in a spray pattern 98 for the first overspray slurry which has a width less than that of the tiles 10 and which is shown in dotted outline in FIG. 6. The oscillator 90 is capable of moving the scraper 66 and thus the spray pattern 98 along the transverse path for the scraper 66 as represented by a double headed arrow 100 in FIG. 6.

The second overspray applicator 54 is substantially identical to the first overspray applicator 52 shown in FIGS. 4 and 5. Thus, the scraper 66 in the second overspray applicator 54 provides a second overspray of slurry in a pattern 102 which is substantially less than the width of the tiles 10 and which is shown in dotted outline in FIG. 6. As in the case of the first overspray applicator 52, the second overspray applicator 54 has an oscillator 90 which can be used to move the spray pattern 102 across the width of the tiles 10 as represented by a double headed arrow 104.

As noted above the spray pattern 96 of the base coat applicator 50 extends across the entire width of the tiles 10 and the solenoid 76 thereof continuously remains "on" so as to spray essentially the entire top surface 74 of each tile 10 formed by the extruder 38 as the tile 10 passes through the base coat applicator 50. With each tile thusly colored the base color, the additional colors from the first and second overspray applicators 52 and 54 can be applied to the tiles in varying amounts and in varying locations to provide each of the tiles 10 with a desired multi-color pattern.

As noted above in connection with FIG. 2 the coloring of the various concrete roof tiles 10 in varying multi-color patterns has become popular because of the different visual effects which can be achieved thereby that are not possible when tiles are colored a single color. At the same time conventional techniques for producing multi-color tiles typically require considerable extra effort on the part of the installer during installation of the tiles. Typically the tiles are colored using a simple, frequently repeating process or program in which the application of the overspray slurries is varied in a simple, frequently repeating pattern. For example, the spray pattern of one or more overspray applicators may be continuously reciprocated across the widths of the tiles with the overspray slurries being continuously sprayed. This results in the application of the overspray slurries to the tiles in a pattern which repeats with every few tiles.

The installation of multi-color tiles produced by conventional techniques may require hand blending on the part of the installer. This is a process whereby the installer hand picks the individual tiles from a large group of tiles as they are laid in sequence across the roof. An experienced installer can usually pick the tiles so as to achieve a desired visual effect. This is usually done by choosing tiles based on the quantity and location of the different colors thereon so as to avoid a mechanical looking design on the finished roof while at the same time perhaps emphasizing different colors from different angles or directions from which the roof is viewed. In an effort to eliminate this laborious process on the part of the installer, some of the conventional multi-color patterns have been established so as to provide for an acceptable appearance if the tiles are installed in a particular order. For example, a conventional coloring technique might produce four different multi-color patterns on four successive tiles, which patterns are then repeated with the next four successive tiles, and so on. Such an arrangement will typically require that the tiles be installed in a one-two-three-four sequence across the roof and with the sequence of the tiles in the next lower row of tiles bearing a certain relationship thereto. While this tends to be less laborious than hand blending, it still requires the installer to sort some or all of the tiles into groups and to install the tiles in a particular sequence from the various groups.

It will therefore be appreciated that the ability to install multi-color tiles at random and at the same time provide the desired visual effects would be highly advantageous. Tiles which can be installed at random eliminate the need for an experienced installer, particularly one who has the ability to successfully do hand blending. In addition the speed of installation is greatly increased, even in the case where relatively inexperienced installers are used.

In accordance with the invention the tiles are colored with multiple colors in a manner which varies in truly random fashion. At the same time regard is given to the frequency and duration with which each color is applied in relation to the other colors so as to achieve a desired blend in terms of color dominance. The tiles can be installed on the roof in completely random fashion while at the same time achieving the desired visual effects. Thus, the tiles can be installed in the order in which they are taken from the conveyor, or they can be installed in any other order in which they are made available to the installer at the job site.

Tile coloring techniques in accordance with the invention begin with the application of the base coat of slurry to essentially the entire top surface of each tile in the usual fashion. Thereafter, however, each overcoat slurry is applied in an intermittent, randomly varying fashion. By using a multistep controller in which the duration of each step is randomly varied, both the occurrence and the duration of application of each overspray slurry may be varied in random fashion. This combines with the feathering effect of the applicator apparatus previously described so as to produce a succession of tile coloring patterns which are truly unique and are never exactly repeated. Thus, although the program of controller steps is eventually repeated, the feathering effect of the spraying provided by such apparatus varies to a sufficient extent to continuously change the patterns and keep them unique. The uniqueness of the patterns is particularly facilitated if the location of the spray pattern across the widths of the tiles is varied in essentially random fashion. This is accomplished in accordance with the invention by using the oscillators of the overspray applicators to intermittently advance the scrapers and by randomly varying amounts between the intermittent, randomly varying applications of the overspray slurries.

A particular example of a process in accordance with the invention is illustrated in FIG. 7. FIG. 7 is a chart listing the successive operations performed by a controller in carrying out the process. The process shown in FIG. 7 is carried out using the arrangement shown in FIG. 6 which includes the base coat applicator 50, the first overspray applicator 52, and the second overspray applicator 54. The controller used in the example of FIG. 7 is a model SYSMAC-PO sequence controller manufactured by OMRON.

The particular process illustrated in FIG. 7 involves 64 separate steps which are sequenced through by the controller. The extreme left-hand column of FIG. 7 lists the steps beginning with the step "00" and ending with the step "63". The three columns to the right of the steps list the instructions that are provided to the controller during each of the 64 steps. One such instruction is the operation "OP" that is to be performed by the controller for each of the 64 steps. The instructions also include "DATA 1" and "DATA 2" which are explained hereafter.

In the very first step 00, the operation (OP) to be performed is a "2". A "2" or "RETURN" operation causes the controller to read the digital values "00" and "01" shown in the DATA 1 and DATA 2 columns in FIG. 7. This provides that in the event of a power failure, the controller will not restart without an appropriate command and will restart at the particular one of the 64 steps where the power failure occurred.

The operation in steps 01 through 63 is a "9" or "TIMER" operation. This instructs the controller to provide the output settings in the seven different columns designated "2" through "8" on the right-hand side of FIG. 7 for the period of time shown in the DATA 1 and DATA 2 columns. The total number of seconds of the time period are shown in the DATA 1 column, while frictions of a second are shown in the DATA 2 column. Thus, during the step 01, the controller provides the output settings shown for a period of 1.5 seconds. During the step 02, the controller provides the output settings shown for a period of 2.7 seconds.

When the controller reaches the very last step 63 in the process of FIG. 7 it encounters a "3" or "JUMP" operation. This causes the controller to jump back to the first step 00 so that the process of FIG. 7 is repeated.

As previously noted the output settings of the controller during each of the 64 steps are shown in seven different columns designated "2" through "8". An "X" in a particular column indicates that that particular output is active or turned-on during that step. The absence of an "X" in a particular column indicates that the output is inactive during that particular step.

As previously noted in connection with FIG. 6, the base coat applicator 50 has a scraper 66 which extends across the entire lengths of the drum 62 and the brush 64 and which does not undergo reciprocating motion. There is no oscillator 90 in the base coat applicator. The scraper 66 of the base coat applicator 50 provides a spray pattern 96 which extends across the entire width of each of the passing tiles. In this manner the entire top surface 74 of each passing tile 10 is coated with the base color by the base coat applicator 50. The solenoid 76 of the base coat applicator 50 is continuously energized to completely cover the top surface 74 of each tile 10 with the base coat slurry. This operation is provided in the example of FIG. 7 by the output shown in column "6" which is designated "BP". It will be noted in FIG. 7 that the "6" or the "BP" output is active during each of the steps 01 through 62. This keeps the solenoid 76 of the base coat applicator 50 continuously energized so that the top surface 74 of each tile 10 is completely covered with the base coat slurry.

As previously described in connection with FIG. 6, the first overspray applicator 52 provides a spray pattern 98 which is less than the width of the tiles 10 and which is moved across the width of the passing tiles by the oscillator 90. As noted in connection with FIGS. 4 and 5, the first overspray applicator 52 also includes the electrically operated pump 58 for pumping a stream of the slurry into the reservoir 60. This results in the reservoir 60 dispensing a controlled stream of the slurry onto the cylindrical drum 62 along the length of the drum 62 to form a layer or coating of the slurry on the outer surface of the drum 62 as the drum rotates downwardly and away from the bottom of the reservoir 60. The first overspray applicator 52 also includes the solenoid 76 which moves the scraper 66 against the outer surface of the drum 62 when energized. This causes the scraper 66 to strip the coating or layer of slurry from the outer surface of the drum so that the slurry flows down the scraper 66, over the flick roll 72 and onto the brush 64 for spraying onto the top surface 74 of the passing concrete roof tiles 10.

The electrically operated pump 58 of the first overspray applicator 52 is controlled by the "OP 1" output of the controller shown in output column "2" of FIG. 7. At the beginning of each of the controller steps in which the "OP 1" output is active as indicated by an "X" in FIG. 7, the electrically operated pump 58 of the first overspray applicator 52 is energized and remains energized for the duration of that step as represented by the time shown in the DATA 1 and DATA 2 columns. During those steps in which the "OP 1" output is inactive as represented by the absence of an "X" in FIG. 7, the electrically operated pump 58 is not energized during that step. It will be seen from FIG. 7 that the electrically operated pump 58 of the first overspray applicator 52 is energized during most but not all of the steps of the process of FIG. 7.

The solenoid 76 of the first overspray applicator 52 is controlled by the "SOL. 1" output of the controller which is shown in output column "5" of FIG. 7. During each step in which the "SOL. 1" output is active as indicated by an "X", the solenoid 76 is energized during that step. The absence of an "X" means that the solenoid 76 of the first overspray applicator 52 is not energized during that step. It will be seen from the "SOL. 1" output in FIG. 7 that the solenoid 76 of the first overspray applicator 52 is energized during some of the steps but is de-energized during most of the steps of the process of FIG. 7.

The oscillator 90 of the first overspray applicator 52 is controlled by the "OSL 1" output of the controller shown in output column "7" of FIG. 7. The oscillator 90 is normally energized so as to move the scraper 66 back and forth in reciprocating fashion. Accordingly, during those steps in which the "OSL 1" output of the controller is inactive as represented by the absence of an "X", the oscillator 90 continues to move the scraper 66 back and forth in this fashion. However, when the "OSL 1" output is active as represented by an "X", the oscillator 90 is de-energized at the beginning of that step so as to terminate movement of the scraper 66 during the remainder of that step. At the end of that step, the oscillator 90 is energized to commence movement of the scraper 66 but in the opposite direction. Thus, during the steps 01 and 02 of the process of FIG. 7, the oscillator 90 of the first overspray applicator 52 remains energized so as to continue moving the scraper 66 back and forth in reciprocating fashion. At the beginning of the step 03 in which the "OSL 1" output is active, the oscillator 90 is de-energized during the 0.9 second duration of such step. This brings the scraper 66 to rest. At the beginning of the next step 04, the "OSL 1" output is inactive and the oscillator 90 is again energized so as to move the scraper 66 in a direction opposite the direction in which the scraper 66 was moving at the beginning of the step 03.

It will be seen from FIG. 7 that with the exception of a few steps in which the oscillator 90 and the scraper 66 are stopped and then reversed in direction, the oscillator 90 is energized so as to move the scraper 66 back and forth in reciprocating fashion.

As previously described the second overspray applicator 54 is virtually identical in construction to the first overspray applicator 52 and includes an electrically operated pump 58, a solenoid 76 and an oscillator 90. These three items of the second overspray applicator 54 are respectively controlled by the "OP 2", "SOL. 2" and "OSL 2" outputs of the oscillator which are shown in output columns "3", "4" and "8".

As in the case of the first overspray applicator 52, the electrically operated pump 58 of the second overspray applicator 54 is energized during most but not all of the steps of the process of FIG. 7 as illustrated by the "OP 2" output in output column "3" of FIG. 7. Similarly, the solenoid 76 of the second overspray applicator 54 is energized during some but not all of the steps as illustrated by the "SOL. 2" output in output column "4" of FIG. 7. And again as in the case of the oscillator 90 of the first overspray applicator 52, the oscillator 90 of the second overspray applicator 54 is de-energized and then reversed during occasional steps but not during most of the steps as illustrated by the "OSL 2" output in output column "8" of FIG. 7.

It will be seen from the example of FIG. 7 that the first and second overspray applicators 52 and 54 have the pumps 58 thereof, the solenoids 76 thereof and the oscillators 90 thereof activated and deactivated in a manner which results in random and nonrepeating color patterns on the tiles. The occasional de-activation of the pumps 58, the turning on and off of the solenoids 76 and particularly the totally random stopping and reversing of the oscillators 90 are provided for by the random timing programmed into the controller. Even though the 64 steps of the process are continually repeated by the controller during spraying of the tiles, the position of the scrapers 66 as controlled by the oscillators 90 are constantly changing due to the random nature of such movement. The occasional turning off of the pumps 58 of the first and second overspray applicators 52 and 54 provides a variable volume of paint slurry to the applicators, providing for further variation in the color patterns on the tiles. The "SOL. 1" and "SOL. 2" outputs of the process of FIG. 7 show that the solenoids 76 of the first and second overspray applicators 52 and 54 are periodically de-energized and then again energized. The de-energization of the solenoid 76 results in gradual removal of the scraper 66 from the outer surface of the drum 62, and this action causes a feathering effect of the overspray colors.

The arbitrariness and uniqueness of the tile coloring provided by the process of FIG. 7 can be even further appreciated by analyzing the active and inactive states of the various outputs of the controller during the successive steps of the process. The process of FIG. 7 requires 132.2 seconds to complete as represented by the total of the time values in the DATA 1 and DATA 2 columns during the steps 01 through 62. If the tiles 10 move along the conveyor 32 at a speed of 86 tiles per minute, then approximately 189 tiles are sprayed during the 64 steps of the process of FIG. 7. The solenoid 76 of the base coat applicator 50 remains on during all 62 steps so as to continuously spray the base coat during the entire 132.2 seconds of the process. The pump 58 of the first overspray applicator 52 which is controlled by the "OP 1" output is activated during 54 of the 62 steps for a total of 119.3 seconds during the process. The pump 58 of the second overspray applicator 54 as shown by the output "OP 2" is activated during 55 of the 62 steps for a total of 113.8 seconds of the 132.2 second total process time. The solenoid 76 of the first overspray applicator 52 as represented by the "SOL. 1" output is energized during 37 of the 62 steps for a total of 77.5 seconds of the 132.2 second total process time. The solenoid 76 of the second overspray applicator 54 as represented by the "SOL. 2" output is energized during 39 of the 62 steps for a total of 78.8 seconds of the 132.2 second total process time. The oscillator 90 of the first overspray applicator 52 as represented by the "OSL 1" output remains on during 50 of the 62 steps for a total of 108.6 seconds of the 132.2 second total process time. During the other 12 steps the oscillator 90 is deactivated and then reversed. These 12 steps represent a total of 23.6 seconds of the 132.2 second total process time. As shown by the "OSL 2" output, the oscillator 90 of the second overspray applicator 54 remains energized during 46 of the 62 steps for a total of 101.6 seconds of the 132.2 second total process time. During the other 16 steps, the oscillator 90 is de-energized and then reversed. The 16 steps represent a total of 30.6 seconds of the 132.2 second total process time.

While various forms and modifications have been suggested, it will be appreciated that the invention is not limited thereto but encompasses all expedients and variations falling within the scope of the appended claims.

What is claimed is:

1. A process for coloring a plurality of roof tiles consisting of applying a plurality of colors to each of the plurality of roof tiles in a randomly varying manner so that the pattern of plural colors formed thereby on any one of the roof tiles is never exactly duplicated on another roof tile.

2. The invention set forth in claim 1, wherein the step of applying a plurality of colors includes the steps of applying a base color to each of the plurality of roof tiles and thereafter applying at least one additional color to each of the plurality of roof tiles, the at least one additional color being applied in a randomly varying manner so that the pattern of the at least one additional color on any one of the roof tiles is never exactly duplicated on another roof tile.

3. The invention set forth in claim 2, wherein each of the plurality of roof tiles has a top surface, the base color is applied to essentially all of the top surface of each of the plurality of roof tiles and the at least one additional color is thereafter applied to part but not all of the top surface of each of the plurality of roof tiles.

4. The invention set forth in claim 1, wherein the step of applying a plurality of colors includes the steps of applying a base color to each of the plurality of roof tiles and thereafter applying one or more of at least two additional colors to each of the plurality of roof tiles, the at least two additional colors being applied in a randomly varying manner so that the pattern of one or more of the at least two additional colors on any one of the roof tiles is never exactly duplicated on another roof tile.

5. The invention set forth in claim 4, wherein each of the plurality of roof tiles has a top surface, the base color is applied to essentially all the top surface of each of the plurality of roof tiles and one or more of the at least two additional colors are applied to part but not all of the top surface of each of the plurality of roof tiles.

6. A process for painting each of a succession of roof tiles comprising the steps of continuously and successively moving a plurality of roof tiles through a painting area, continuously spraying a base paint onto the roof tiles from a first applicator located within the painting area and intermittently spraying a second paint of color different from the base paint onto the roof tiles from a second applicator located within the painting area downstream of the first applicator relative to the moving plurality of roof tiles, the intermittent spraying of the second paint being for timed periods which are varied in random fashion.

7. The invention set forth in claim 6, wherein each of the plurality of roof tiles has a width thereacross in a direction transverse to a direction of movement thereof through the painting area, the base paint is sprayed onto each of the plurality of roof tiles across the entire width thereof and the second paint is intermittently sprayed onto the roof tiles in a pattern which is narrower than the width of the roof tiles from spraying apparatus which is randomly positioned at different locations along a path of movement transverse to the direction of movement of the plurality of roof tiles through the painting area.

8. The invention set forth in claim 6, wherein the second applicator includes a rotating cylindrical brush and means for applying the second paint to the rotating cylindrical brush during the timed periods.

9. The invention set forth in claim 6, further including the step of intermittently spraying a third paint of color different from the base paint and the second paint onto the roof tiles from a third applicator located within the painting area downstream of the second applicator relative to the moving plurality of roof tiles, the intermittent spraying of the third paint being for timed periods which are varied in random fashion.

* * * * *